Patented Dec. 29, 1936

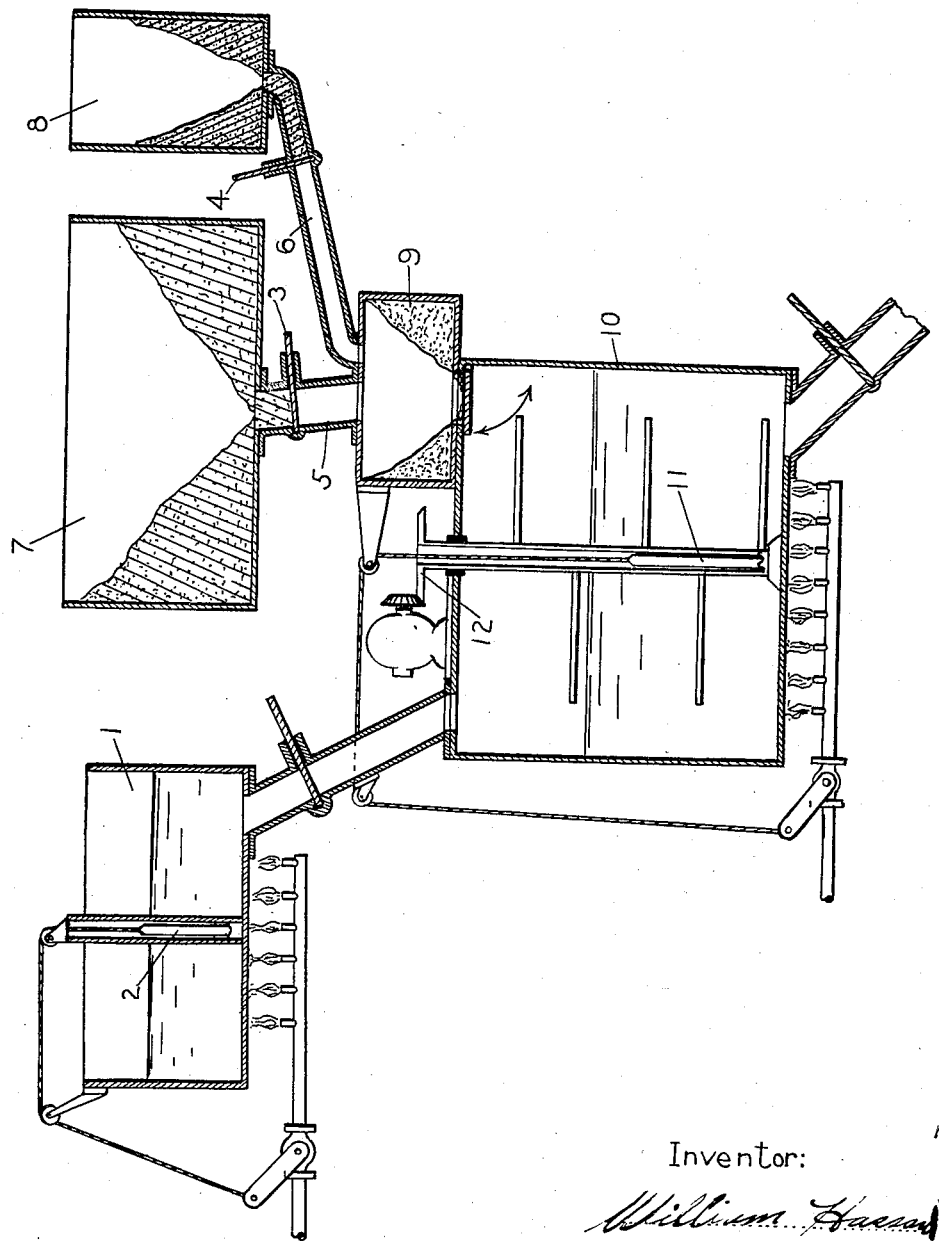

2,066,289

UNITED STATES PATENT OFFICE 2,066,289

PROCESS FOR STABILIZING GILSONITE

William Hassard, Vancouver, British Columbia, Canada

Application February 19, 1936, Serial No. 64,629

1 Claim. (Cl. 106—31)

My invention relates to a process for stabilizing gilsonite and the like and has for its object the improvement of the products of such for commercial use, inasmuch as the same are rendered more uniform and homogeneous throughout the mass, more stable under varying degrees of temperature, less likely to soften with heat or to crack with cold, this latter being partly due to the said improved homogeneity accomplished as hereinafter described by the use of casein in the primary mixture.

It is also an object of this invention to minimize carbonization and oxidation which cause loss of tenacity so frequently experienced with products of this nature produced by existing methods.

It is well known that many methods involving the addition of a chloride, plaster of Paris and other substances have been developed with varying degrees of success but all are characterized by the objectionable features of ordinary asphaltic products, namely, instability in physical properties under changes in temperature, instability chemically as a result of weathering, settling and non-homogeneity due to original faulty processing; but I do maintain that the addition of raw sugar in the proper proportion to maintain a suitable amount of moisture and to form a hard complex compound having the nature of a gluco-magnesium silicate when combined with enstatite or its equivalent is a part of my invention.

My process may be divided into three main steps:

First, the gilsonite is heated to a temperature high enough to completely liquefy the same without causing break-down of the material, and this may be conveniently carried out in the tank I shown in the accompanying drawing which forms part of this disclosure, and the heating of this tank is preferably thermostatically controlled as indicated at 2.

Second, reasonably pure enstatite, or its equivalent, previously ground into powder and hereinafter termed the agent, is mixed with casein, hereinafter termed the sub-agent, this sub-agent having the property of causing more complete homogeneity of the whole, preventing the settling of the agent so that the agent remains in suspension rather than forming a solid mass or cake in the bottom of the melting pot, and it also prevents the formation of any oily film on the surface of the finished product when subjected to sun heat.

The mixture of the powders can be successively carried out, in my apparatus, by manipulation of the gate valves 3 and 4 controlling the gravity feed tubes 5 and 6 which carry these ingredients from the bins 7 and 8 into the mixing bin 9.

Third, the gilsonite, previously heated as described, is mechanically mixed with the agent and sub-agent, the latter substances being added very slowly while the former is kept agitated and heated.

It is preferred that the volume of this hot mixture be kept fairly constant so that its temperature is more easily regulated by thermostatic controls, but if it is desired to first fill the gas heated pot 10 with hot gilsonite and then slowly add the agent and sub-agent it will be necessary to slowly raise the temperature of the mixture to prevent caking, some mechanical mixer such as I have indicated at 11, housing a thermostat controlling the heating of the pot, must be used to keep the hot mixture constantly stirred by such means as the electric motor geared with a multi-vane mixer as indicated at 12.

For certain uses I have found that raw sugar, in addition to the commonly used sodium chloride, can be added and more especially in the presence of casein produces the meritorious effects hereinbefore mentioned.

The finished product varies according to the proportions of the ingredients used and the character of the raw materials, but the use to which the product is to be put determines whether the amount of gilsonite will exceed or be less than the amount of enstatite and the proportions may conceivably vary so that each may form from ten to eighty per cent of the total mass but the proportions of casein and chloride probably never need to be greater than five per cent each of the total weight.

By varying the percentages of the stated ingredients I have produced materials which have been in actual use for considerable periods with very satisfactory results and employed as paving material and as a binder for other road materials, flooring, insulation, roofing, marine glue and other uses and these products have been more consistently durable and generally satisfactory than any other commercial product of this nature tested.

I claim:

The process of stabilizing gilsonite by heating the same slightly above its melting temperature, slowly mixing therewith a mixture of powdered material rich in magnesium silicates and casein by mechanical mixture with the application of heat, and the addition to the resultant mixture of salt and raw sugar.

WILLIAM HASSARD.